United States Patent
Roman

(10) Patent No.: US 9,369,775 B2
(45) Date of Patent: Jun. 14, 2016

(54) METHODS AND SYSTEMS FOR DELIVERING SIGNALS FROM CABLE NETWORKS TO TELECOMMUNICATIONS NETWORKS

(75) Inventor: Gerald J. Roman, Jacksonville, FL (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 3045 days.

(21) Appl. No.: 10/355,685

(22) Filed: Jan. 31, 2003

(65) Prior Publication Data

US 2004/0154043 A1   Aug. 5, 2004

(51) Int. Cl.
| | |
|---|---|
| *H04N 7/16* | (2011.01) |
| *H04N 7/173* | (2011.01) |
| *H04N 21/647* | (2011.01) |
| *H04N 21/414* | (2011.01) |
| *H04B 7/185* | (2006.01) |
| *H04L 12/28* | (2006.01) |
| *H04N 7/10* | (2006.01) |

(52) U.S. Cl.
CPC ..... *H04N 21/64707* (2013.01); *H04B 7/18578* (2013.01); *H04N 21/41407* (2013.01); *H04B 7/18506* (2013.01); *H04L 12/2801* (2013.01); *H04N 7/10* (2013.01); *H04N 7/17336* (2013.01)

(58) Field of Classification Search
CPC .................. H04N 21/25825; H04N 21/41407; H04N 7/17336
USPC ........................................ 725/62, 73, 13, 106
See application file for complete search history.

(56) References Cited

U.S. PATENT DOCUMENTS

| | | | |
|---|---|---|---|
| 5,042,063 A | 8/1991 | Sakanishi | |
| 5,247,347 A * | 9/1993 | Litteral et al. | ................ 725/114 |
| 5,983,186 A | 11/1999 | Miyazawa | |
| 6,188,985 B1 | 2/2001 | Thrift | |
| 6,198,947 B1 | 3/2001 | Barber | |
| 6,311,182 B1 | 10/2001 | Colbath | |
| 6,616,700 B1 * | 9/2003 | Thum et al. | ................... 715/273 |
| 6,650,891 B1 * | 11/2003 | Wierzbitzki et al. | ........ 455/414.3 |
| 6,766,163 B1 * | 7/2004 | Sharma | ...................... 455/412.1 |
| 6,950,624 B2 * | 9/2005 | Kim et al. | .................... 455/3.01 |
| 7,054,419 B2 * | 5/2006 | Culliss | ........................ 379/88.22 |
| 7,174,297 B2 * | 2/2007 | Guerra et al. | ............. 704/270.1 |
| 7,206,744 B2 * | 4/2007 | Suryanaraya | .............. 704/270.1 |
| 7,298,836 B2 * | 11/2007 | Wellons et al. | ............... 379/219 |
| 2001/0011302 A1 | 8/2001 | Son | |
| 2002/0019984 A1 * | 2/2002 | Rakib | .......................... 725/111 |
| 2002/0066392 A1 | 6/2002 | Calam | |
| 2002/0067839 A1 | 6/2002 | Heinrich | |
| 2002/0160766 A1 * | 10/2002 | Portman et al. | ............... 455/422 |
| 2004/0092266 A1 * | 5/2004 | Olrik | ............................ 455/445 |

* cited by examiner

*Primary Examiner* — Michael Hong

(74) *Attorney, Agent, or Firm* — Scott P. Zimmerman, PLLC

(57) ABSTRACT

Methods and systems are disclosed for delivering electrical signals from a cable network to a telecommunications network. The electrical signals are received from a community antenna television network and communicated via the telecommunications network. The telecommunications network may then communicate those electrical signals to end-users and to customers. Because the electrical signals may include video, music, data, and other cable content, this cable content is communicated along the telecommunications network and, thus, distributed to an end user.

7 Claims, 13 Drawing Sheets

METHODS AND SYSTEMS FOR DELIVERING SIGNALS FROM CABLE NETWORKS TO TELECOMMUNICATIONS NETWORKS

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but the copyright owner otherwise reserves all copyrights whatsoever.

BACKGROUND OF THE INVENTION

1. Field of the Invention

This invention generally relates to cable networks and to telecommunications networks and, more particularly, to methods and systems that receive electrical signals from a cable network and communicate those electrical signals along a telecommunications network.

2. Description of the Related Art

Telecommunications is converging into broadband networks. Telecommunications networks in the past have been generally divided into three distinct groups: i) community antenna television networks, ii) local and wide-area computer networks, and iii) public-switched telephone networks. These three networks were independent of each other and delivered unique services to customers. The traditional cable networks, for example, delivered one-way video content, however, the cable networks did not offer telephony and data services. Telephone networks, similarly, did not offer analog and digital video services. Today, however, the Telecommunications Act of 1996 ushered in deregulation and permitted any telecommunications service provider to enter another's market. Because of this legislative enactment, the three separate telecommunications services are converging into a single broadband network and, thus, delivering a wide range of entertainment and data services.

While this convergence benefits consumers, this convergence presents problems for the telecommunications service provider. If a traditional telephone service provider, for example, wants to provide digital video and music content to their subscribers, the telephone service provider must first obtain the digital content. That is, the telephone service provider must obtain the music, videos, and other content to provide to customers. Obtaining this content, however, requires a heavy investment in an entertainment infrastructure. The telephone service provider must find and employ people with knowledge and experience in the entertainment industry. The telephone service provider must determine who is the target subscriber and what content satisfies that target subscriber. The telephone service provider must also obtain the intellectual property rights to legally provide this content. These simple but broad concerns often represent a very expensive investment in an infrastructure that provides content along a converged telecommunications network. There is, accordingly, a need for a less expensive alternative to converged networks, a need for telecommunications service providers to less expensively provide broadband content, and, in particular, a need for cable networks and telephone networks to provide broadband content without a large investment in separate and competing networks.

BRIEF SUMMARY OF THE INVENTION

The aforementioned problems, and other problems, are reduced by methods and systems for delivering electrical signals from cable networks to telecommunications networks. This invention delivers cable content from a community antenna television network to an end user. The term "end user" generally describes any person, company, or entity receiving the cable content. This cable content is delivered via a telecommunications network. This cable content, such as analog and digital video, music, and data, is hereinafter generally referred to as "electrical signals." These electrical signals are communicated from the community antenna television network to the telecommunications network. The telecommunications network then communicates those electrical signals to end-users. This invention, then, presents a method for telecommunications service providers to deliver video and music content without heavy investment in an infrastructure. The community antenna television network can provide a content "feed" to the telecommunications network, and the telecommunications network may then distribute this content to end users. Because this invention builds upon the existing strengths of cable network operators and of telephone network operators, this invention delivers broadband content to a wider audience without heavy investment by either operator.

One aspect of this invention describes a method for delivering electrical signals from a cable network to a telecommunications network. The electrical signals are received from a community antenna television network and communicated via the telecommunications network. "Community antenna television network," as used herein, is the generally accepted term describing any cable television network. Because the electrical signals are communicated from the community antenna television network to the telecommunications network, the telecommunications network may then communicate those electrical signals to end-users and customers. Because the electrical signals may include video, music, data, and other cable content, this cable content is communicated along the telecommunications network and, thus, distributed to an end user.

Another aspect of this invention describes an alternative method for delivering electrical signals. This method receives electrical signals at a community antenna television network. The electrical signals are then communicated to a telecommunications network. Because the electrical signals may include video, music, data, and other cable content, this cable content is communicated to the telecommunications network for distribution to an end user.

Still another aspect of this invention describes yet another method for delivering electrical signals. Electrical signals are communicated via a connection between a community antenna television network and a telecommunications network. The electrical signals are then communicated to a customer via the telecommunications network.

BRIEF DESCRIPTION OF THE SEVERAL VIEWS OF THE DRAWINGS

These and other features, aspects, and advantages of this invention are better understood when the following Detailed Description of the Invention is read with reference to the accompanying drawings, wherein.

DETAILED DESCRIPTION OF THE INVENTION

This invention now will be described more fully hereinafter with reference to the accompanying drawings, in which exemplary embodiments are shown. This invention may, however, be embodied in many different forms and should not be construed as limited to the embodiments set forth herein; rather, these embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (e.g., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

This invention delivers cable content from a community antenna television network via a telecommunications network. This cable content, such as analog and digital video, music, and data, is herein generally referred to as "electrical signals." These electrical signals are communicated from the community antenna television network to the telecommunications network. The telecommunications network may then communicate those electrical signals to end-users. The term "end user" generally describes any person or entity receiving the electrical signals, such as a customer.

Figure 1:
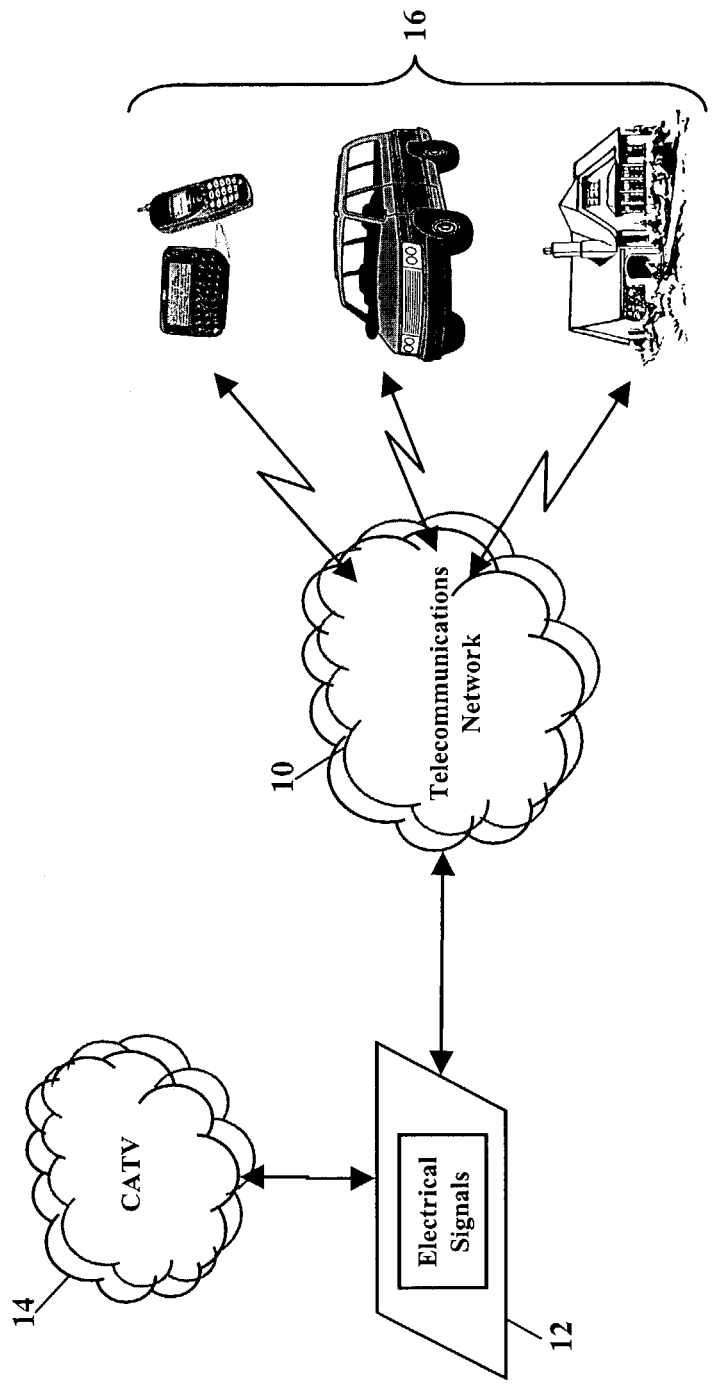
FIG. 1 is a schematic illustrating an embodiment of this invention.

FIG. 1 is a schematic illustrating an embodiment of this invention. A telecommunications network 10 receives electrical signals 12 from a community antenna television network 14. These electrical signals 12 represent video, data, audio, and other content distributed from the community antenna television network 14. The electrical signals 12 are communicated via the telecommunications network 10 to an end user 16. Because the electrical signals include video, music, data, and other analog/digital cable content, the telecommunications network 10 delivers this cable content to the end user 16.

The term "community antenna television network," as used herein, is a generic term describing any cable network. "Community antenna television network," or CATV, is generally used to describe cable television networks and cable television. See, e.g., SHLOMO OVADIA, BROADBAND CABLE TV ACCESS NETWORKS 2 n. 1 (2001). Because "community antenna television network" is generically used to describe any cable television network, the term "community antenna television network" encompasses coaxial cable networks, fiber optic networks, hybrid fiber and coax networks, and wireless links within these networks (e.g., radio-frequency (RF) and microwave).

Figure 2:
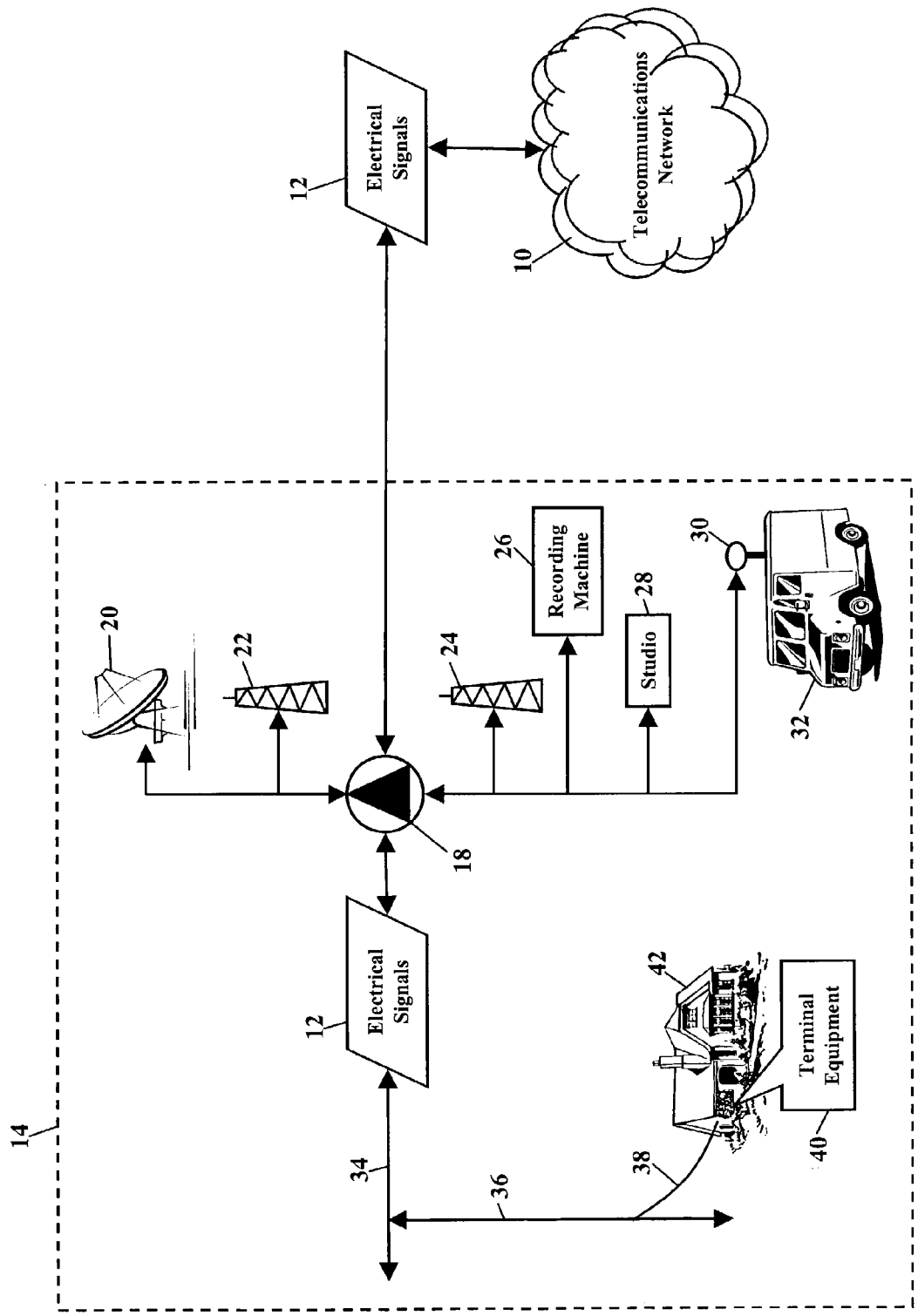
FIGS. 2 and 3 are schematics illustrating another embodiment of this invention.
Figure 3:
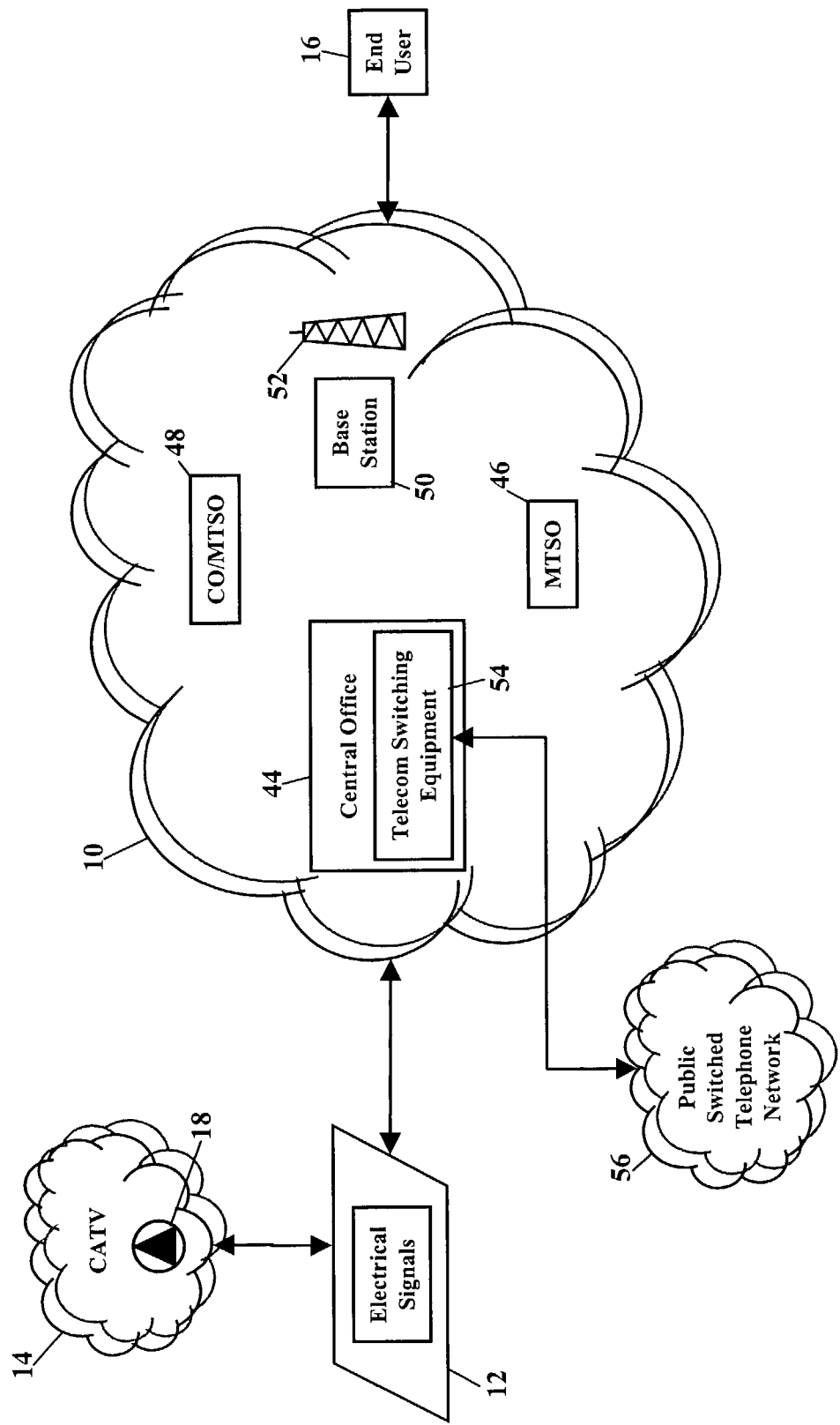

FIGS. 2 and 3 are schematics illustrating another embodiment of this invention. Here the telecommunications network 10, and the community antenna television network 14, is shown in more detail. As FIG. 2 shows, a headend 18 is an origination point for content in the community antenna television network. The headend 18 receives content from various sources and distributes, or delivers, the content along the community antenna television network 14. The headend 18, for example, may receive content from a satellite system 20, from a distant broadcaster 22, from a local broadcaster 24, from recording machines 26 that playback taped content, and from a studio 28 that originates content. The headend 18 may also receive content via an electromagnetic link 30 (e.g., RF and microwave). A mobile studio 32, for example, often supplies coverage of sporting events and other live events via this electromagnetic link 30. Because this content is digital and/or analog (e.g., video, music, data), the electrical signals 12 representing this content are distributed along a system of one or more trunk cables 34. This system of one or more trunk cables 34 distributes the electrical signals 12 to a system of one or more distribution cables 36. A drop cable 38 delivers the electrical signals 12 from the distribution cable 36 to terminal equipment 40 at a subscriber's premises 42. Because the community antenna television network 14 is well understood, this patent only presents a simplified discussion of cable networks. If the reader desires a more detailed discussion of cable networks, the reader is directed to CICORA ET AL., MODERN CABLE TELEVISION TECHNOLOGY 9-13 (1999) and to SHLOMO OVADIA, BROADBAND CABLE TV ACCESS NETWORKS 1-10 (2001), each of which is incorporated herein by reference.

FIG. 3 shows the electrical signals 12 are communicated via the telecommunications network 10. The telecommunications network 10 receives the electrical signals 12 from the community antenna television network 14. The electrical signals 12, for example, may be received from the headend 18. The electrical signals 12, however, may be received from the satellite system, from the distant broadcaster, from the local broadcaster, from the recording machines, from the studio, and from the electromagnetic link, such as the mobile studio (shown, respectively, as reference numerals 20, 22, 24, 26, 28, 30, and 32). The electrical signals 12 are communicated via the telecommunications network 10 to the end user 16. The telecommunications network 10, for example, may communicate the electrical signals 12 via a central office (CO) 44, via a mobile telephone switching office (MTSO) 46, and/or via a combination CO/MTSO 48. The telecommunications network 10 may also communicate the electrical signals 12 via a base station facility 50 or an antenna facility 52 of a mobile telephone network. As those of ordinary skill in the art of telecommunications understand, the central office 44, the mobile telephone switching office (MTSO) 46, the combination CO/MTSO 48, the base station facility 50, and the antenna facility 52 could each comprise telecommunications switching equipment 54 that communicates with a Public Switched Telephone Network 56. The telecommunications switching equipment 54 could include Advanced Intelligent Network (AIN) componentry. The telecommunications switching equipment 54 could also include a packet-based "softswitch" that uses software control to provide voice, data, and video services by dynamically changing its connection data rates and protocols types. Either of these telecommunications facilities may be used to communicate the electrical signals 12 to the end user 16.

Figure 4:
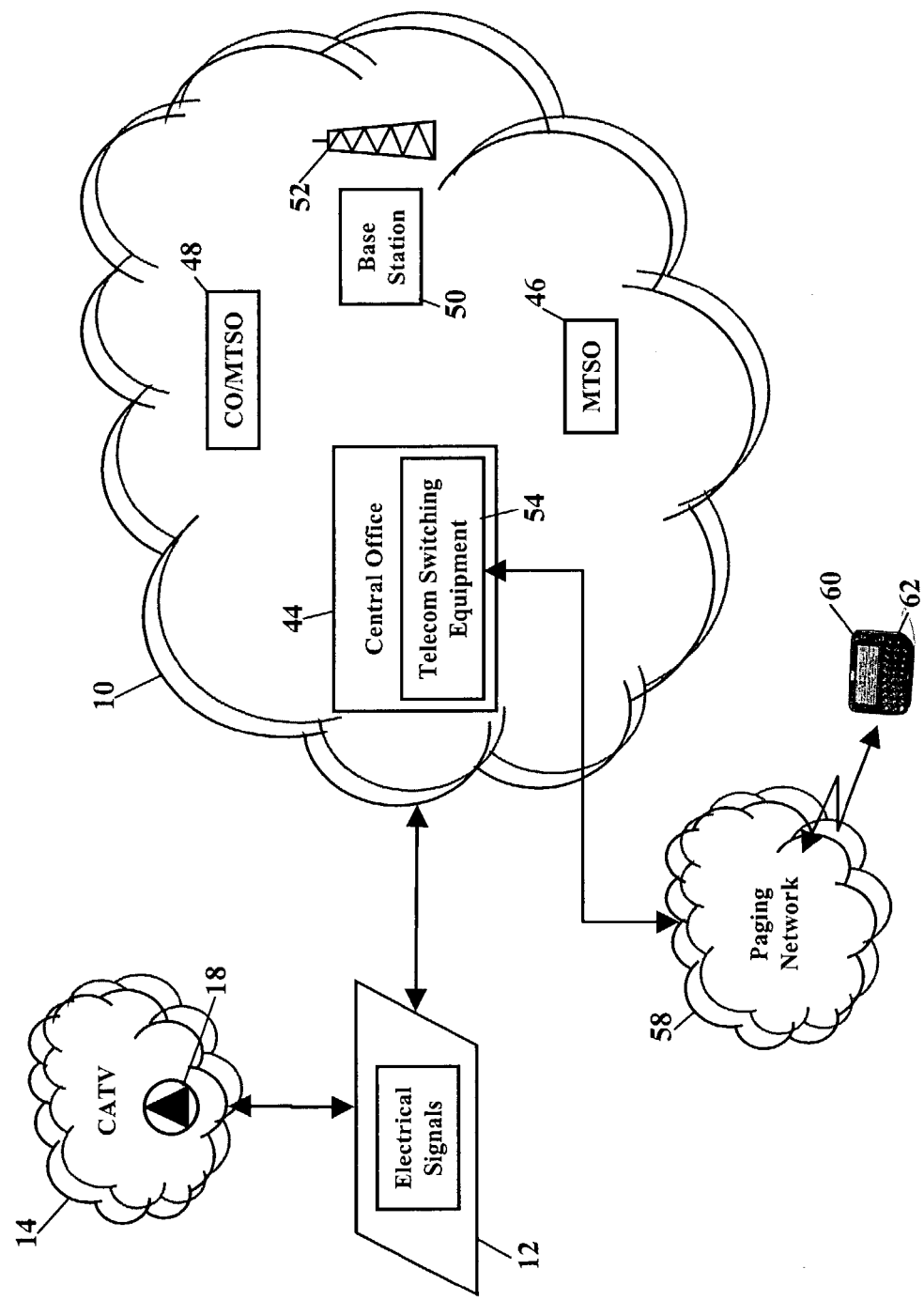
FIG. 4 is a schematic illustrating still another embodiment of this invention that communicates cable content via a telecommunications network and via a paging network.

FIG. 4 is a schematic illustrating still another embodiment of this invention. Here the electrical signals 12 are communicated via the telecommunications network 10 and via a paging network 58. Because the telecommunications network 10 includes the telecommunications switching equipment 54, the telecommunications switching equipment 54 may communicate with the paging network 58. The paging network 58 then wirelessly communicates the electrical signals 12 to a wireless communications device 60, such as a pager 62. The wireless communications device 60 could also communicate electronic signals to the paging network 58, and the telecommunications network 10, using the same infrastructure. Various standards and technologies could be used to support wireless communication to and from the wireless communications device 60.

Figure 5:
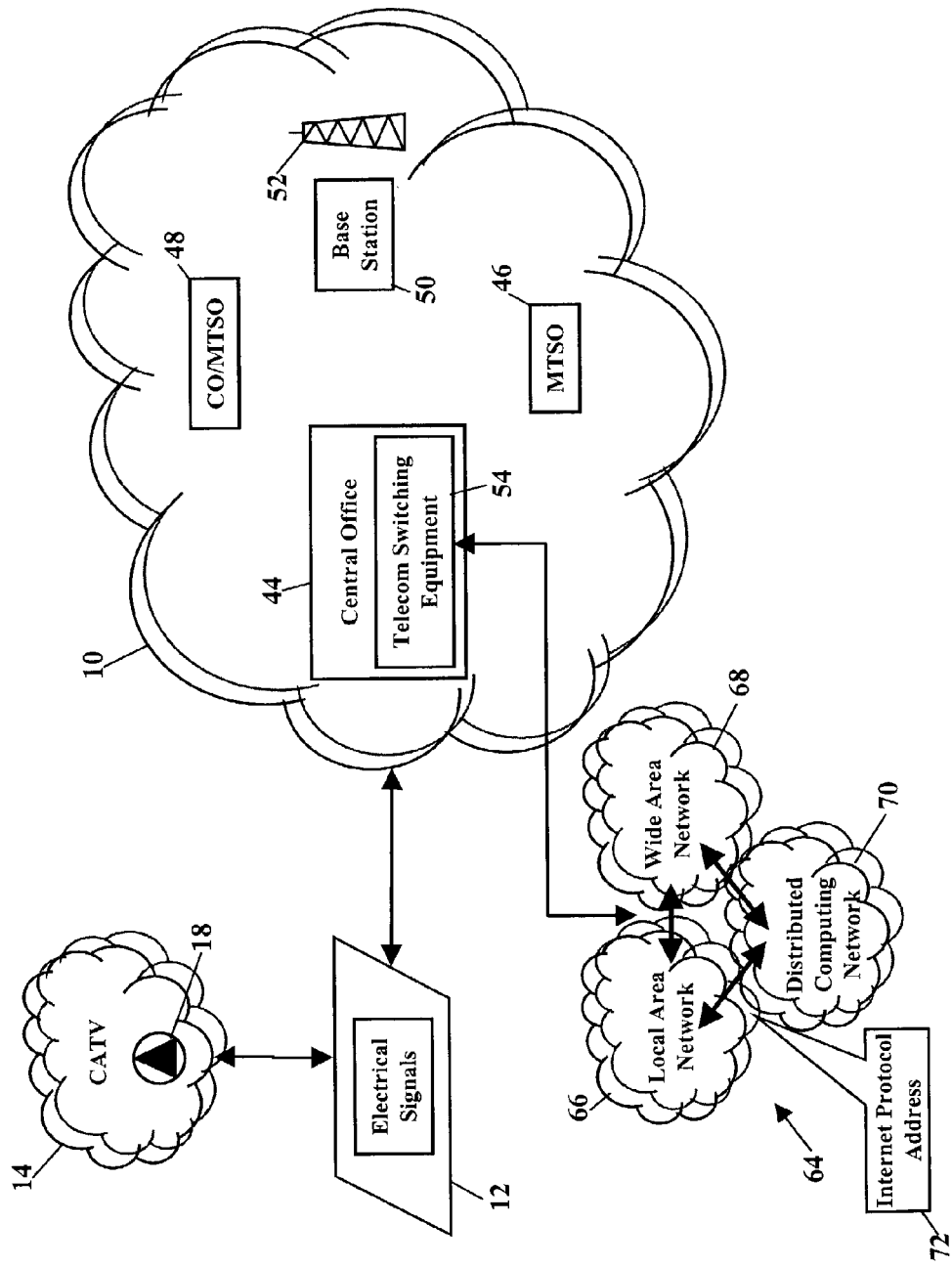
FIG. 5 is a schematic illustrating another embodiment of this invention that communicates cable content via a telecommunications network and via a data network.

FIG. 5 is a schematic illustrating another embodiment of this invention. Here the electrical signals 12 are communicated via the telecommunications network 10 and via a data network 64. The data network 64 may comprise a local area network 66, a wide area network 68, a distributed computing network 70 (e.g., the Internet), and/or any other network for communicating electronic data. Because the telecommunications network 10 includes the telecommunications switching equipment 54, the telecommunications switching equipment 54 may communicate with the data network 64. The electrical signals 12 may be communicated to any destination along the data network 64. The electrical signals 12, for example, may be communicated to an Internet Protocol address 72 on the data network 64.

Figure 6:
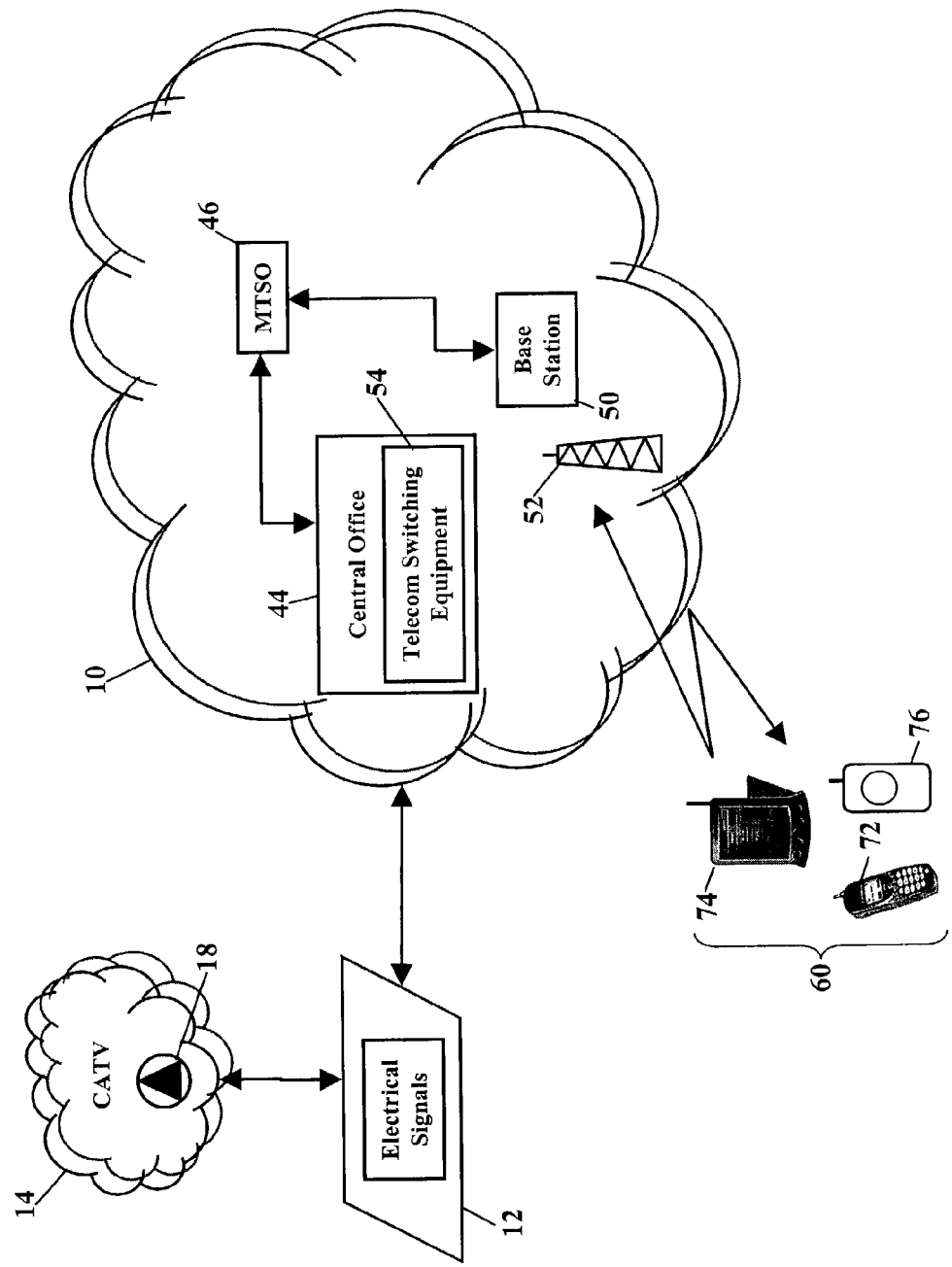
FIGS. 6-10 are schematics of still other alternative embodiments of this invention that wirelessly communicate cable content via a telecommunications network.

FIG. 6 is a schematic of yet another alternative embodiment of this invention. FIG. 6 shows the telecommunications network 10 may wirelessly communicate the electrical signals 12. The electrical signals 12 are communicated from the community antenna television network 14 to the telecommunications network 10. The electrical signals 12, for example, are communicated by the telecommunications switching equipment 54 to the mobile telephone switching office 46. The mobile telephone switching office 46 then communicates the electrical signals 12 to the base station 50. The base station 50 then wirelessly communicates the electrical signals 12 to the wireless communications device 60, such as a mobile phone 72, a wireless personal data assistant 74, or a wireless digital music device 76 (such as a wireless .mp3 player). The wireless communications device 60 could also communicate electronic signals to the telecommunications network 10 using the same infrastructure. Various standards and technologies could be used to support wireless communication to and from the wireless communications device 60, such as various cellular techniques (e.g., the so-called 2G, 2.5G, and 3G techniques), the I.E.E.E. 802 family of wireless techniques, the Industrial and Scientific band of the electromagnetic spectrum (e.g., "Bluetooth"). Those of ordinary skill in the art also recognize the same infrastructure could also be used to communicate electronic data to a satellite phone 78. Because these cellular techniques and wireless techniques are well understood by those of ordinary skill in the art, this patent will not further describes these techniques. If, however, the reader desires more information on these techniques, the reader is invited to consult Yi-BrNG LIN & IMRICH CHLAMTAC, WIRELESS AND MOBILE NETWORK ARCHITECTURES (2001).

Figure 7:
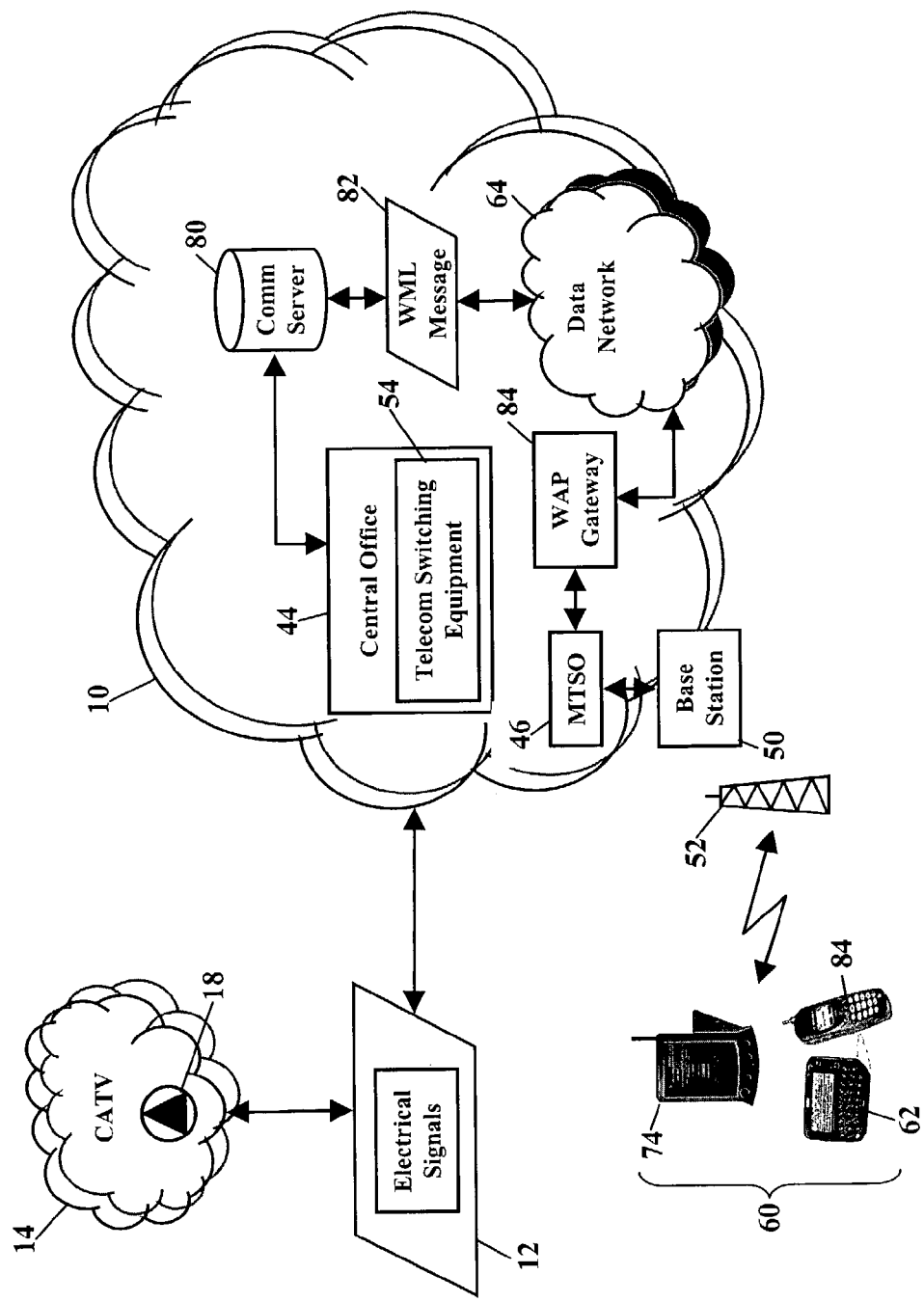

FIG. 7 is a schematic of yet another alternative embodiment of this invention. FIG. 7 shows the telecommunications network 10 may wirelessly communicate the electrical signals 12 using the Wireless Application Protocol (WAP) technique. The electrical signals 12 are communicated by the telecommunications switching equipment 54 to a communications ("Comm") server 80. The Comm server 80 formats the electrical signals 12 into one or more Wireless Mark-up Language (WML) messages 82. The WML messages 82 are then communicated over the data network 64 to a WAP gateway 84. The WAP gateway 84 then communicates the electrical signals 12 to the mobile telephone switching office 46 and then to the base station 50. The base station 50 wirelessly communicates the electrical signals 12 to the wireless communications device 60, such as a WAP phone 84, the pager 62, or the wireless personal data assistant 74. Those of ordinary skill in the art of telecommunications understand the WAP gateway 84 uses a WAP push proxy server to push messages to the WAP phone 84, the pager 62, or the wireless personal data assistant 74. The Wireless Mark-up Language (WML) and the WAP technique are known and will not be further described. This is a description of a solution for a specific wireless protocol, such as WAP. This solution may be clearly extended to other wireless protocol, such as i-mode. If the reader desires more information on the WAP technique, the reader is invited to consult YI-BING LIN & IMRICH CHLAMTAC, WIRELESS AND MOBILE NETWORK ARCHITECTURES 379-94 (2001), incorporated herein by reference.

Figure 8:
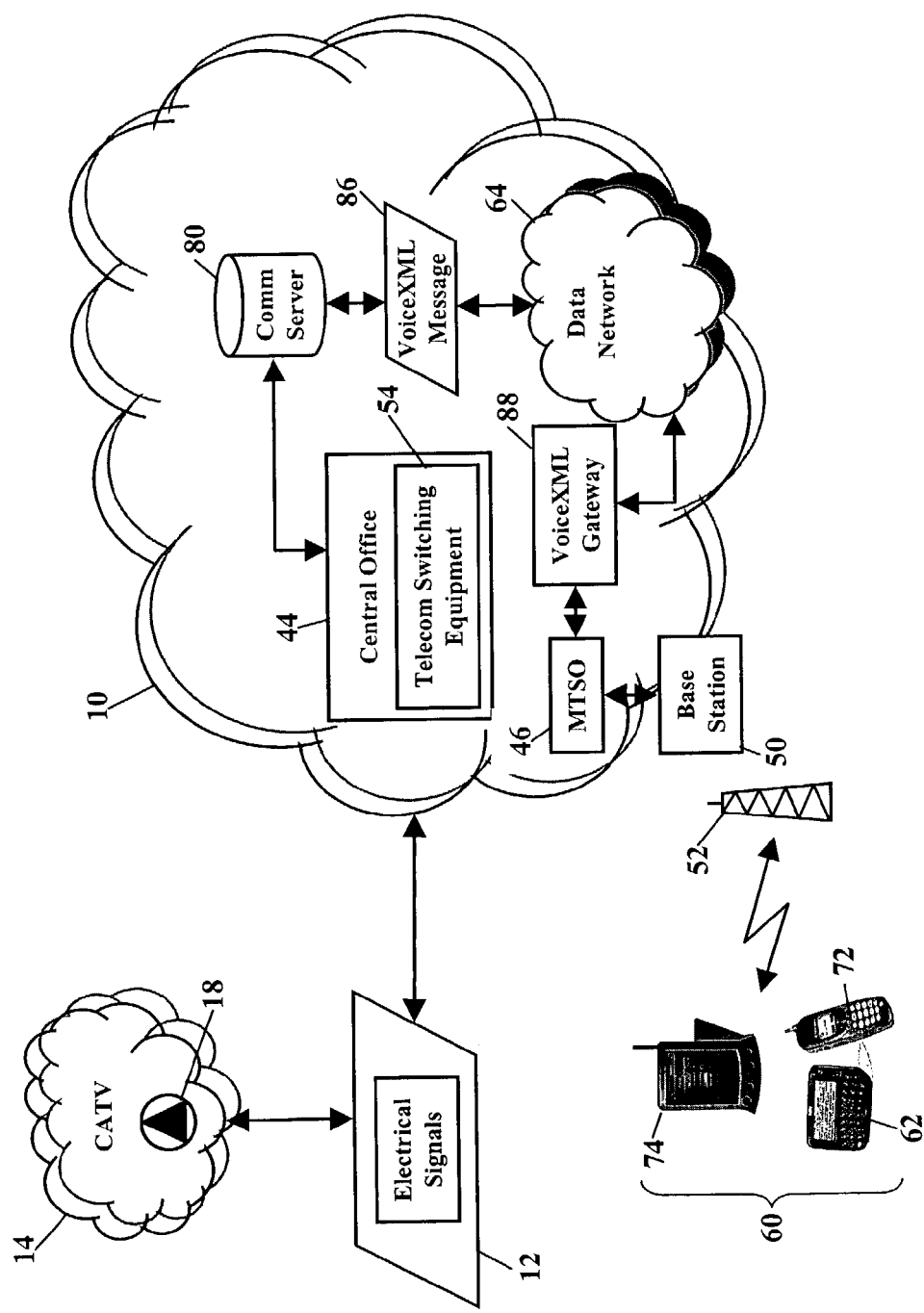

FIG. 8 is a schematic of yet another alternative embodiment of this invention. FIG. 8 shows the telecommunications network 10 may wirelessly communicate the electrical signals 12 using the wireless technique VoiceXML (Voice extensible Markup Language). The electrical signals 12 are communicated by the telecommunications switching equipment 54 to the Comm server 80. The Comm server 80 formats the electrical signals 12 into one or more VoiceXML messages 86. The VoiceXML messages 86 are then communicated over the data network 64 to a VoiceXML gateway 88. The VoiceXML gateway 88 then communicates the electrical signals 12 to the mobile telephone switching office 46 and then to the base station 50. The base station 50 wirelessly communicates the electrical signals 12 to the wireless communications device 60, such as the mobile phone 72, the pager 62, or the wireless personal data assistant 74.

The end user (shown as reference numeral 16 in FIGS. 1 & 3) could use Dual Tone Multi-Frequency (DTMF) keys to approve or decline the electrical signals 12. If, for example, the end user wishes to decline content, the end user may transmit a Dual Tone Multi-Frequency (DTMF) key to indicate the end user does not wish to wirelessly receive the electrical signals 12. If the end user prefers to approve the wireless communication of any content, the end user, similarly, may transmit a DTMF key to approve any wireless communication or transmission of electrical signals 12. DTMF signaling is a means of transferring information from the end user through the use of in-band audio tones. Each digit of information is assigned a simultaneous combination of one of a lower group of frequencies and one of a higher group of frequencies to represent each digit or character. Those of ordinary skill in the art of telecommunications understand the VoiceXML gateway 88 enables access to, and modification of, web-based information through a normal voice interface. VoiceXML, in addition, provides for automatic speech recognition and/or text-to-speech communication. VoiceXML, therefore, provides understandable communication between the customer, using the mobile phone 72, the pager 62, and the wireless personal data assistant 74, and an application running on the Comm server 80. The VoiceXML technique, the VoiceXML gateway 88, and the DTMF technique are known and will not be further described.

Figure 9:
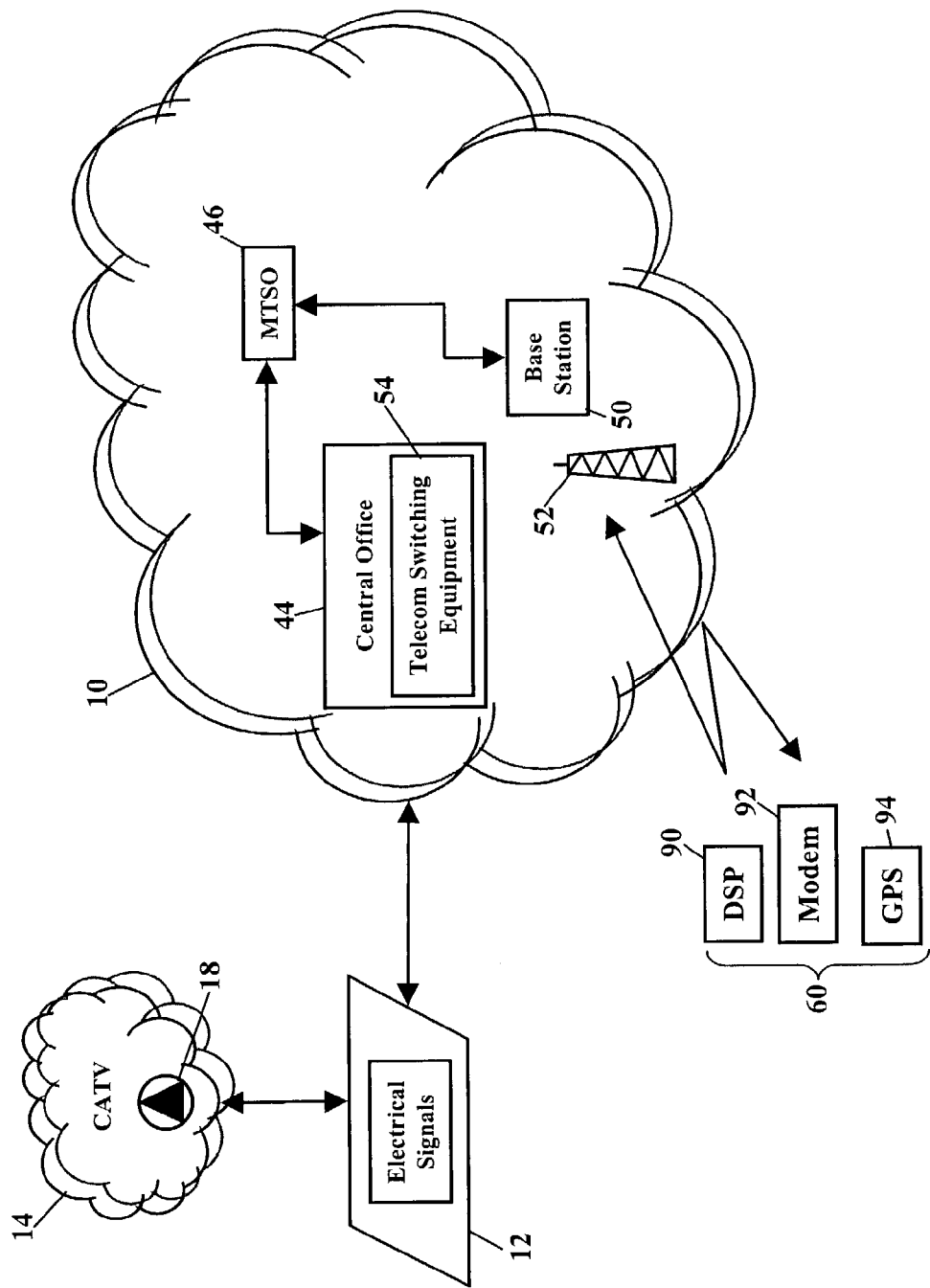

FIG. 9 is a schematic of another alternative embodiment of this invention. FIG. 9 illustrates the electrical signals 12 may be wirelessly communicated to any device having a digital signal processor 90 and/or a modem 92. FIG. 9 also shows the electrical signals 12 may be wirelessly communicated to a Global Positioning System ("GPS") device 94 that receives, or that displays, Global Positioning System coordinates. The electrical signals 12, for example, are communicated by the telecommunications switching equipment 54 to the mobile telephone switching office 46. The mobile telephone switching office 46 then communicates the electrical signals 12 to the base station 50. The base station 50 then wirelessly communicates the electrical signals 12 to the device having the digital signal processor 90, to the modem 92, and to the Global Positioning System ("GPS") device 94.

Figure 10:
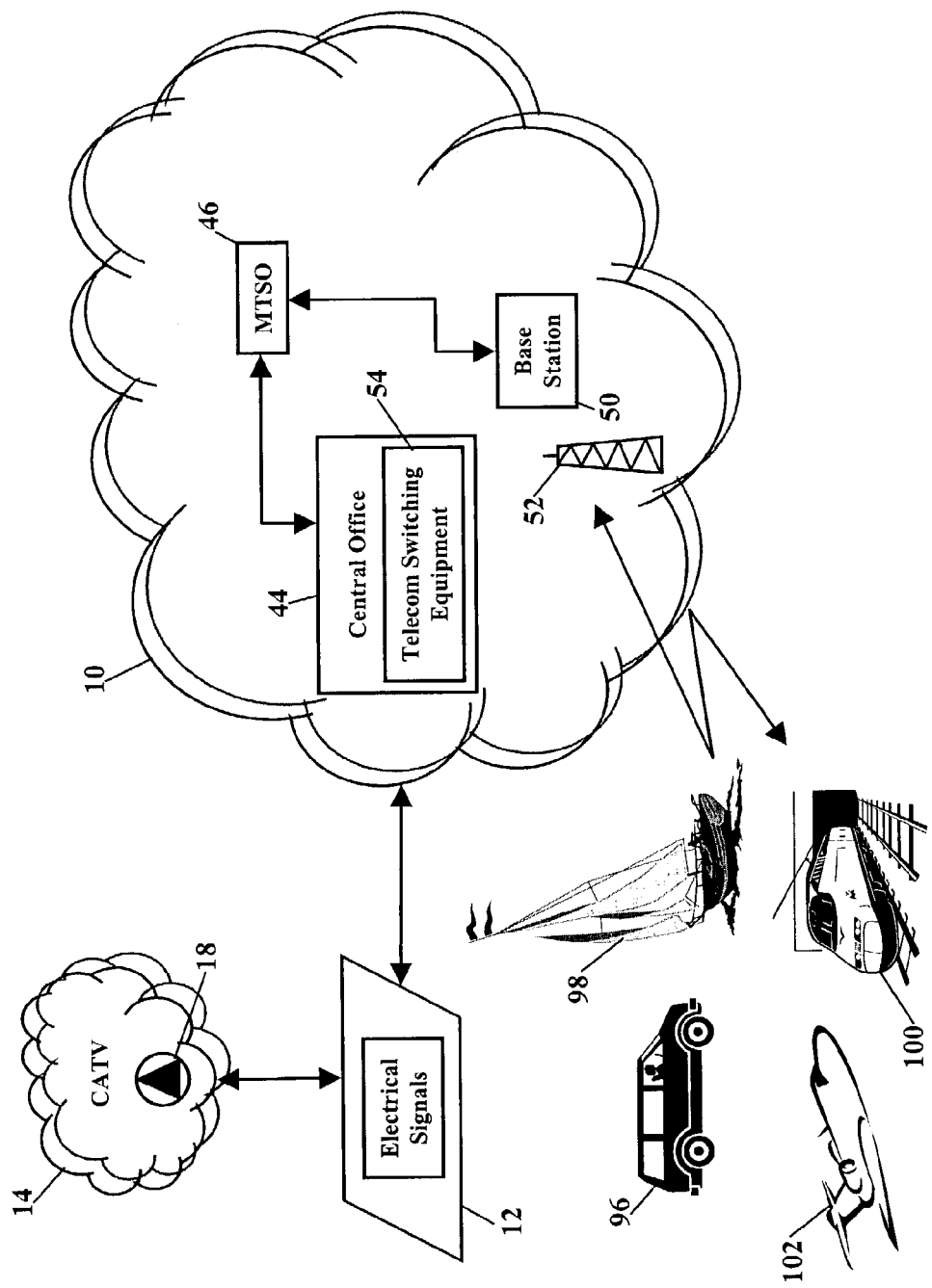

FIG. 10 is a schematic of another alternative embodiment of this invention. FIG. 10 illustrates the electrical signals 12 may be wirelessly communicated to at least one of a vehicle 96, a watercraft 98, a locomotive 100, and an aircraft 102. The electrical signals 12, for example, are communicated by the telecommunications switching equipment 54 to the mobile telephone switching office 46. The mobile telephone switching office 46 then communicates the electrical signals 12 to the base station 50. The base station 50 then wirelessly communicates the electrical signals 12 to the vehicle 96, the watercraft 98, the locomotive 100, and the aircraft 102. The vehicle 96, the watercraft 98, the locomotive 100, and the aircraft 102 may comprise equipment, such as the digital signal processor, the modem, and/or the Global Positioning System ("GPS") device (shown, respectively, as reference numeral 90, 92, and 94 in FIG. 9), for wirelessly receiving the electrical signals 12 from the telecommunications network 10.

Figure 11:
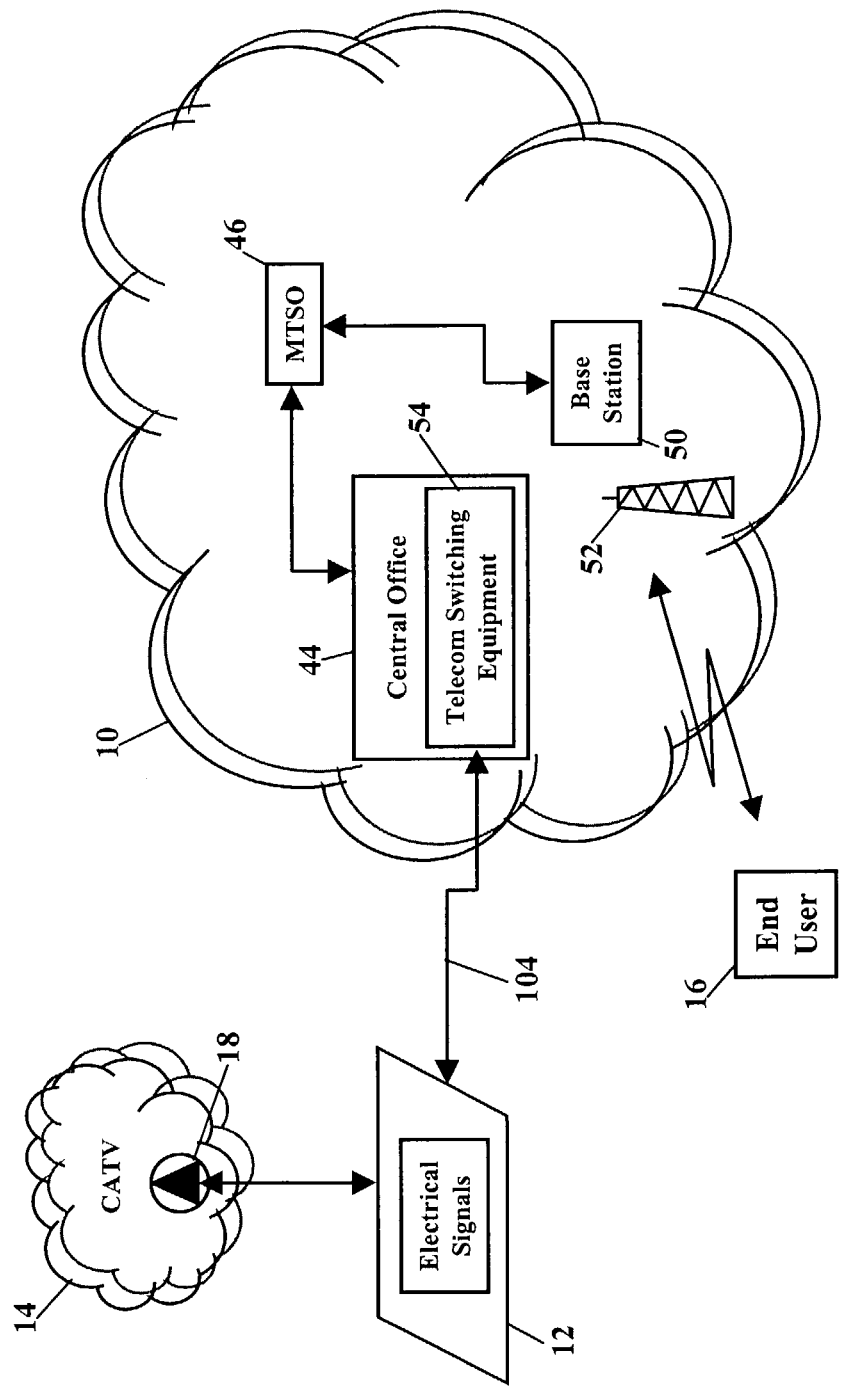
FIG. 11 is a schematic of still another alternative embodiment of this invention that communicates cable content a data connection.

FIG. 11 is a schematic of still another alternative embodiment of this invention. Here the electrical signals 12 are communicated between the community antenna television network 14 and the telecommunications network 10 via a data connection 104. This data connection 104 may be a satellite link, an electromagnetic link using any portion of the electromagnetic spectrum (e.g., RF or microwave), and/or a landline/wireline link. FIG. 10, for example, shows the data connection 104 communicating the electrical signals 12 between the headend 18 and the telecommunications switching equipment 54. The electrical signals 12 are then communicated by the telecommunications switching equipment 54 to the mobile telephone switching office 46. The mobile telephone switching office 46 then communicates the electrical signals 12 to the base station 50. The base station 50 then wirelessly communicates the electrical signals 12 to the end user 16. The electrical signals 12 may be processed before communicating to the telecommunications network 10. The headend 18, for example, may process the electrical signals 12 into a format acceptable to the telecommunications network 10. The telecommunications network 10, alternatively or additionally, may process the electrical signals 12 into an acceptable form. The electrical signals 12, for example, may be compressed, frequency-shifted, amplified, filtered, expanded, or any other process.

Figure 12:
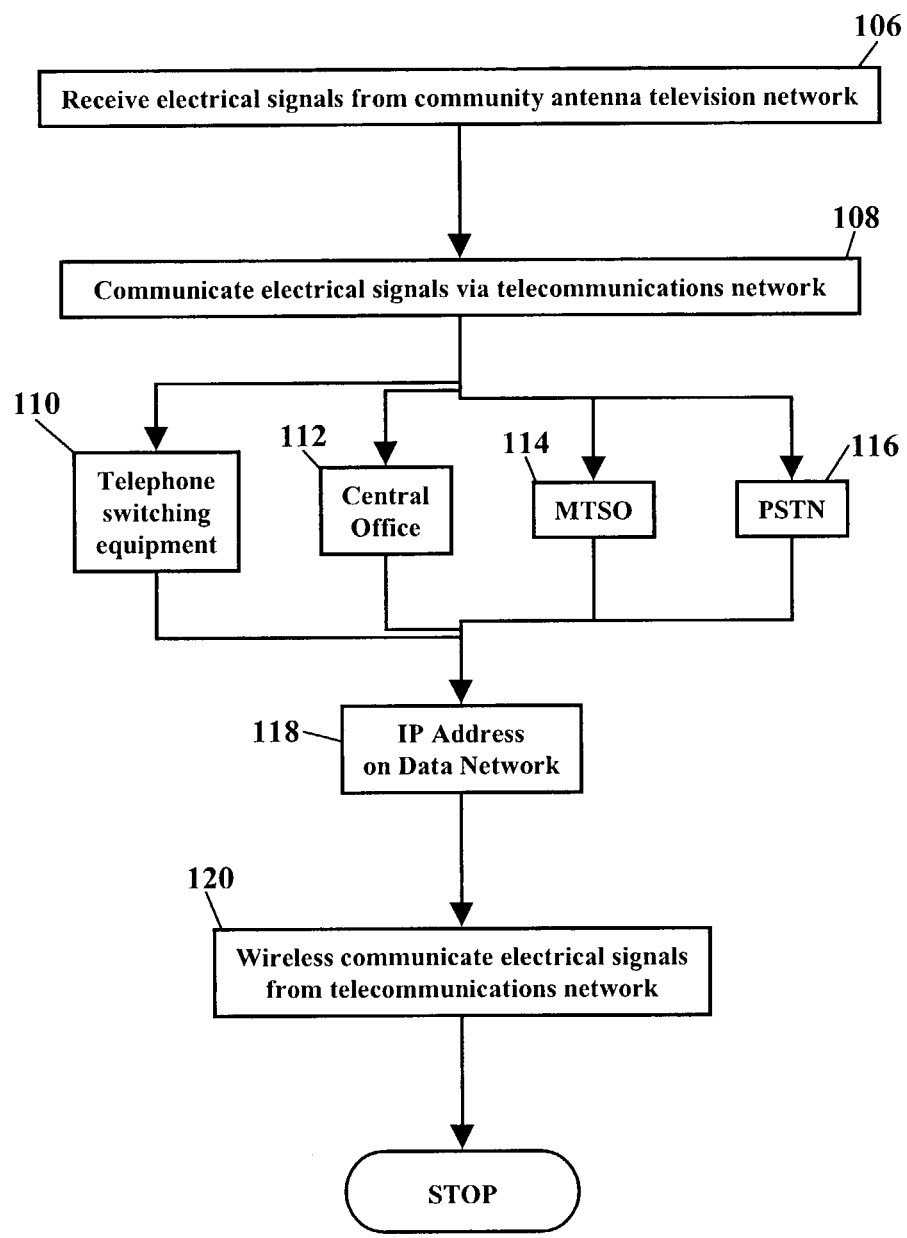
FIG. 12 is a flowchart showing a method of delivering cable content.

FIG. 12 is a flowchart showing a method for delivering electrical signals from a cable network to a telecommunications network. Electrical signals are received from a community antenna television network (Block 106). The electrical signals are then communicated via a telecommunications network (Block 108). The electrical signals may be communicated via telecommunications switching equipment (Block 110), via a central office (Block 112), via a mobile telephone switching office (MTSO) (Block 114), and/or via a Public Switched Telephone Network (PSTN) (Block 116). The electrical signals may also be communicated from the telecommunications network to an Internet Protocol address in data network (Block 118). The electrical signals may also be wirelessly communicated from the telecommunications network (Block 120). The electrical signals, for example, may be wirelessly communicated to at least one of a wireless communications device, a mobile phone, a cellular phone, a Wireless Applications Protocol (WAP) phone, a satellite phone, a pager, a digital music device, a personal digital assistant, a digital signal processor, and a Global Positioning System device. The electrical signals may also be wirelessly communicated from the telecommunications network at least one of a vehicle, a watercraft, a locomotive, and an aircraft.

Figure 13:
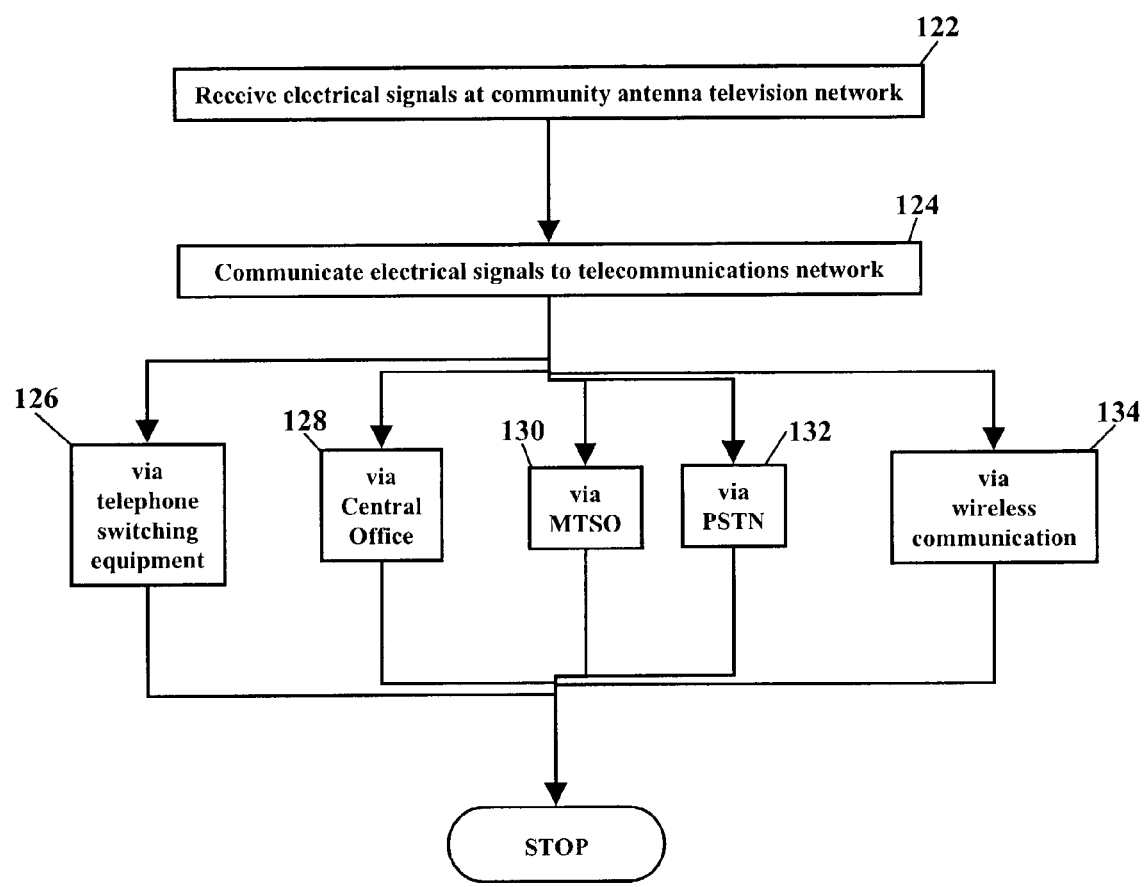
FIG. 13 is a flowchart showing another method of delivering cable content.

FIG. 13 is a flowchart showing an alternative method for delivering electrical signals from a cable network to a telecommunications network. Electrical signals are received at a community antenna television network (Block 122). The electrical signals are communicated to a telecommunications network (Block 124). The electrical signals may be communicated via telecommunications switching equipment (Block 126), via a central office (Block 128), via a mobile telephone switching office (Block 130), and/or via a Public Switched Telephone Network (Block 132). The electrical signals may also be wirelessly communicated to the telecommunications network (Block 134).

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A method, comprising:

receiving, at a server, video content via a satellite link, the video content sent from a headend of a community antenna television network;

sending, from the server, the video content to switching equipment associated with a telecommunications network;

sending, from the switching equipment, the video content to a communications server associated with the telecommunications network;

formatting, by the communications server, all the video content into wireless mark-up language messages;

sending, from the communications server, the wireless mark-up language messages via a data network to a wireless application gateway;

sending, from the wireless application gateway, the wireless mark-up language messages to a base station;

transmitting, from the base station, the wireless mark-up language messages via a wireless data network to a mobile device; and processing, by the base station, a dual-tone multi-frequency signal received from the mobile device via the wireless data network, the dual-tone multi-frequency signal input by a user of the mobile device to decline receipt of the wireless mark-up language messages transmitted from the base station.

2. The method according to claim 1, further comprising formatting all the video content into voice extensible mark-up language messages.

3. The method according to claim 1, further comprising sending the video content to a central office.

4. The method according to claim 1, further comprising sending the video content to a public switched telephone network.

5. A system, comprising:
a processor; and
a memory device storing instructions that when executed cause the processor to perform operations, the operations comprising:
receiving video content via a feed connected to a headend of a community antenna television network:
formatting all the video content into wireless mark-up language messages;
sending the wireless mark-up language messages via a data network to a wireless application gateway for wireless transmission from a base station; and
receiving a dual-tone multi-frequency signal transmitted from a mobile device via the data network, the dual-tone multi-frequency signal input by a user of the mobile device to decline receipt of the wireless mark-up language messages wirelessly transmitted from the base station.

6. A method, comprising:
receiving video and music content from a community antenna television network;
formatting all the video and music content into wireless mark-up language messages;
sending the wireless mark-up language messages to a gateway;
sending the wireless mark-up language messages from the gateway to a base station;
transmitting the wireless mark-up language messages via a wireless data network from the base station;
receiving, by the base station, a dual-tone multi-frequency signal sent via the wireless data network from a mobile device, the dual-tone multi-frequency signal input by a user of the mobile device to decline receipt of the wireless mark-up language messages transmitted via the wireless data network from the base station; and
ceasing transmission of the wireless mark-up language messages from the base station in response to receipt of the dual-tone multi-frequency signal sent via the wireless data network from the mobile device.

7. A method, comprising:
receiving video content from a community antenna television network;
formatting all the video content into voice extensible mark-up language messages;
sending the voice extensible mark-up language messages to a gateway;
sending the voice extensible mark-up language messages from the gateway to a base station;
transmitting the voice extensible mark-up language messages from an antenna associated with the base station;
receiving, by the base station, a dual-tone multi-frequency signal sent via a wireless data network from a mobile device, the dual-tone multi-frequency signal input by a user of the mobile device to decline receipt of the voice extensible mark-up language messages transmitted from the antenna associated with the base station; and
ceasing transmission of the voice extensible mark-up language messages from the antenna associated with the base station in response to receipt of the dual-tone multi-frequency signal sent from the mobile device.

\* \* \* \* \*